United States Patent [19]

Taylor

[11] 4,353,644

[45] Oct. 12, 1982

[54] FRAMES

[75] Inventor: Eric Taylor, London, England

[73] Assignee: Paterson Products Limited, London, England

[21] Appl. No.: 201,985

[22] Filed: Oct. 29, 1980

[30] Foreign Application Priority Data

Nov. 8, 1979 [GB] United Kingdom ................ 7938784

[51] Int. Cl.³ .............................................. G03B 27/58
[52] U.S. Cl. ...................................... 355/72; 40/154
[58] Field of Search ................... 355/72, 75, 122, 123; 40/152, 152.1, 154, 156; 354/340, 344

[56] References Cited

U.S. PATENT DOCUMENTS 2,697,889  12/1954  Heim ........................................ 40/152
2,931,118  4/1960   Riedel ...................................... 40/152
2,958,971  11/1960  Plettner ................................... 40/152

FOREIGN PATENT DOCUMENTS 41650    12/1916  Sweden .
928973   6/1963   United Kingdom .
1280830  7/1972   United Kingdom .
1342894  1/1974   United Kingdom .
1468891  3/1977   United Kingdom .

OTHER PUBLICATIONS

United Kingdom Registered Design 934308.
United Kingdom Registered Design 934605.

Primary Examiner—L. T. Hix
Assistant Examiner—Alan Mathews
Attorney, Agent, or Firm—Darby & Darby

[57] ABSTRACT

Frames are described which can be made by plastics moulding and in which the (usually) four sides and the backing plate are moulded integrally in a single moulding operation. The backing plate does not quite fill the aperture between the four sides so it can be manufactured easily by injection moulding. The frame is suitable for the receipt of a sheet article such as a sheet of photographically sensitized paper between the backing sheet and flanges on the (usually) three sides other than that to which the plate is attached.

4 Claims, 3 Drawing Figures

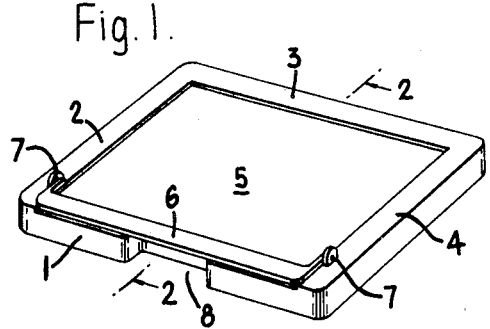
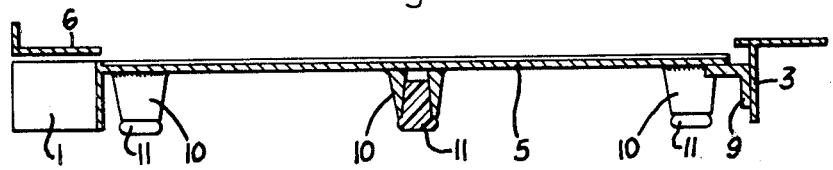
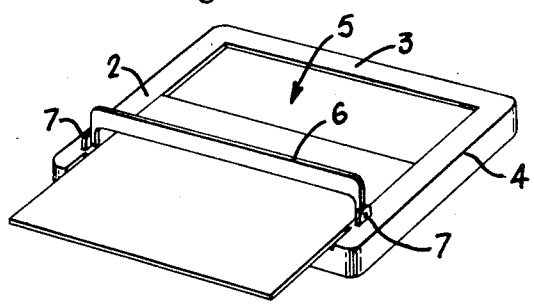

FRAMES

This invention relates to frames and particularly to frames useful in photography for supporting sheets of photographically sensitized paper on an enlarger base board.

Frames for such uses are known made of a variety of materials. Such frames are generally constructed of a number of parts, which are assembled together to give the finished frame. Assembly of the parts may be time consuming and the individual parts are often relatively expensive to manufacture. Particularly if a frame construction has a number of separately moulded components, the tooling costs required if the components are made by injection moulding plastics materials, can be very substantial. However, there is often no more economic way to make such frame parts than injection moulding, and that manufacturing method does give a desirable high quality surface finish.

Frames for mounting photographic transparencies, photographs, or other display material have been made by moulding from plastics material, e.g. as disclosed in British Patent Specification No. 928,973, and other frame construction systems are disclosed in British Patent Specifications Nos. 396,458, 1,280,830, 1,342,894 and 1,468,891, and in U.K. Registered Designs Nos. 934,308 and 934,605. However, none provides a frame which effectively supports a sheet of material held firm and flat without constructional features which require relatively expensive manufacturing and assembly processes.

We have now found that by careful design, frames may be produced with a minimum of assembly and economic use of moulds. According to the first feature of the present invention there is provided a frame adapted to receive a shaped sheet of material which comprises a one piece moulding consisting of a polygonal apertured member and, extending from one side of the apertured member, a flat support plate which, viewed in the direction perpendicular to the plate, substantially but not quite fills the whole of the aperture, the plane of the plate being displaced in a direction normal to that plane a short distance from a plurality of flanges constituting the inner edges of the other sides of the frame.

If desired, the frame may have a further separate edge member adapted to overlie that side of the frame from which the substantially flat plate extends and to lie co-planar with the flanges.

Most often the frame is rectangular and if not square the plate preferably extends from one of the longer sides of the rectangle. Because of the distance in a direction normal to the plate between the plate and the flanges, there is a slot into which a sheet may be inserted, e.g. a card bearing a message, a picture, or a sheet of photographically sensitized material. In the latter case, the frame may be used as a support frame for such material on an enlarger base board, with the flanges and an additional member covering the four edges of the sheet which accordingly remain unexposed.

If desired, the edge of the plate remote from the edge of the frame with which it is integrally moulded may be fixed relative to the adjacent edge of the frame e.g. by means of an intermediate member attached to one or both parts.

Frames according to the present invention may be made simply by a very small number of moulding operations, essentially only one, and require almost no assembly. By virtue of the fact that the plate does not overlap the flanges, it is possible to mould the plate and the frame edges as an integral moulding. Any other pieces may be moulded or, for example, cut from extruded section, as may be most convenient.

The invention is illustrated by way of Example with reference to the accompanying drawing. In the drawing:

FIG. 1 is a perspective view of an enlarger base board frame according to the present invention;

FIG. 2 is a section along the lines 2—2 of FIG. 1 on an enlarged scale, and

FIG. 3 is a view similar to FIG. 1 but showing a sheet of material in the course of its insertion into the frame.

Referring to the drawings the frame consists of four side members 1, 2, 3, 4 and a central plate 5 all moulded integrally. The plate 5 almost but not quite fills the aperture between for four sides 1,2,3,4 and there is a small gap around the edges adjacent sides 2, 3 and 4. The inner edges of sides 2, 3 and 4 finish with a flange and accordingly a sheet of material may be slid between plate 5 and the three flanges on edges 2, 3 and 4. A hinged bar 6 mounted in lugs 7 may be swung down to cover the edge of a sheet so inserted which lies above edge 1. In order to facilitate the handling of such a sheet and particularly its removal from the frame there is an aperture 8 in edge 1.

In order to stop relative movement between the edge of plate 5 nearest edge 3, an angled member 9 is adhered to the underside of plate 5 and the inner side of T-section edge 3.

Integrally moulded with plate 5 are five bosses 10, into each of which is press-fitted a rubber stud 11, which five studs constitute feet for the frame arranged as a quincunx.

I claim:

1. A frame adapted to receive a shaped sheet of material, said frame comprising a one-piece moulding consisting of:
   (a) a polygonal member the sides of which define an aperture, said member having a first side, and a number of other sides, said other sides having flanged inner edges, wherein the flanges lie substantially on the same plane; and
   (b) a substantially flat support plate integrally molded with said polygonal member, and extending from said first side thereof, across the aperture, towards the other sides of said member, the outer edges of said plate, as viewed from a direction normal to the plate plane, being inwardly spaced from the inner edges of said other sides, and the plane of said plate being displaced a short distance from the plane of said flanges.

2. A frame according to claim 1 further comprising an edge member mounted on said polygonal member, and adapted to overlie said first side of said polygonal member and to lie co-planar with said flanges.

3. A frame according to claim 1 wherein said polygonal member is of substantially rectangular shape and said plate extends from one of the longer sides of said polygonal member.

4. A frame according to claim 1 further comprising a support member for fixing the edge of the support plate remote from the first side of said polygonal member to the side of said polygonal member adjacent to said remote edge of said plate, said support member being attached to said plate and said adjacent side of said polygonal member.

* * * * *